United States Patent [19]

Norbäck

[11] 4,025,668

[45] May 24, 1977

[54] METHOD OF MANUFACTURING CONTACT BODIES

[75] Inventor: Per Norbäck, Lidingo, Sweden

[73] Assignee: Aktiebolaget Carl Munters, Sollentuna, Sweden

[22] Filed: Apr. 1, 1975

[21] Appl. No.: 564,116

[30] Foreign Application Priority Data

Apr. 9, 1974 Sweden ............................. 7404818

[52] U.S. Cl. .......................... 427/227; 427/372 B; 427/372 R; 427/376 A; 427/444

[51] Int. Cl.² ...................... B05D 3/04; B32B 3/28; B32B 19/08

[58] Field of Search ................... 428/271, 443, 186; 427/376, 377, 372, 403, 333, 226, 227, 444

[56] References Cited

UNITED STATES PATENTS

| | | | |
|---|---|---|---|
| 1,972,500 | 9/1934 | Toohey et al. | 428/186 X |
| 2,282,230 | 5/1942 | MacAlpine | 427/377 X |
| 2,354,350 | 7/1944 | Schuetz | 428/443 |
| 2,354,351 | 7/1944 | Schuetz | 427/403 X |
| 2,434,466 | 1/1948 | Marc | 428/443 X |
| 3,499,812 | 3/1970 | Glav | 428/443 X |

FOREIGN PATENTS OR APPLICATIONS

| | | | |
|---|---|---|---|
| 998,132 | 7/1965 | United Kingdom | 428/186 |
| 1,040,061 | 8/1966 | United Kingdom | 428/186 |
| 1,140,042 | 1/1969 | United Kingdom | 428/186 |

Primary Examiner—James R. Hoffman
Attorney, Agent, or Firm—John A. Mitchell; Pasquale A. Razzano

[57] ABSTRACT

A method of manufacturing a contact body is disclosed wherein the contact body is built up of thin layers of hydrated asbestos fibers shaped between mutually spaced support positions to form channels extending from end to end of the contact body. The layers have a coating thereon of at least one inorganic substance and the layer body is heated to at least the dehydration temperature of the asbestos, at which the water of crystallization is released by passing a current of hot gas through the channels in the contact body for a relatively short period of time in order to effect the intended action on the body.

9 Claims, No Drawings

METHOD OF MANUFACTURING CONTACT BODIES

The present invention relates to a method of manufacturing contact bodies which are built up of an initial frame of thin layers of asbestos fibers shaped between mutually spaced support places to form channels extending from end to end, the asbestos being hydrated so that on heating to a certain temperature it releases water of crystallization. The layers are coated with one or more inorganic substances and thereupon heated to a temperature exceeding said certain temperature. The contact bodies are intended to be used for the transfer of heat and/or moisture between two media, of which at least one is a gas. An important field of application of the present invention is the transfer of heat and/or moisture between two air currents, e.g. in connection with the ventilation of rooms or spaces by means of fresh air or the drying of air. Other fields of application are heat exchangers for utilizing the heat content in exhaust gases in gas turbines or the like, and contact bodies for carrying catalysts.

In its final condition a contact body of this invention has a more or less ceramic character, especially if the coating or the initial frame material sinters together so that the layers will form a coherent unit. To surpass the temperature of dehydration i.e. that temperature at which the water of crystallization is released from the fibers, the temperature must be raised to about 650° C if the treatment is to be carried out within reasonable time. Sintering requires a temperature of about 1000°-1200° C. Hitherto, in the manufacture of such ceramic bodies the body blanks made of fiber layers and the inorganic coating that has been applied to the layers were heated gradually in several stages to the required final temperature within closed furnaces which thus must be supplied with heat in their entirety. Therefore it is easily understood that the treating time in such a method was long, for example a couple of days and more. Also the furnaces must be so constructed that they can withstand the high final temperature and the consumption of heat during the lengthy process is very high. We have now found that one can reach a perfect result in a relatively short time by effecting the heating of the layer body to effect the intended action on the components, preferably sintering together of the components, by means of a current of hot gas forced or drawn through the individual channels by for example a fan.

After a current of air or gas has been imparted desired velocity or turbulence by a fan or the like, it is heated by the combustion of oil or gas to the high final treating temperature. The gas current is then caused to pass directly through the many fine chanels of the contact body blank, whereupon a rapid heating of the thinlayers including the coating takes place so that the predetermined transformation of components is effected in a fraction of the time previously required. In this way, it is possible to manufacture sintered ceramic bodies in less than one hour and in fact even in less than half an hour. With this greatly reduced treatment time the fuel consumption is reduced to a minimum whereas the production capacity greatly increased.

Asbestos paper normally contains organic binding agents such as up to 15% in order to give the paper the required mechanical strength. These organic constituents can, in the present invention, be utilized insofar as they assist in reaching the final temperature by the additional heat released when the organic constituents are burnt. Because of this one can give to the heated gas current a lower temperature than the required final temperature in the heat treatment. However the gas current should contain oxygen in sufficient quantity to bring about a rapid temperature rise in the layers during the gas currents forced passage through the channels of the body.

This heating effect by the burning of the organic constituents of the paper can be further increased if in addition to the organic binding agents normally contained in the asbestos paper more organic substances are admixed either during the making of the paper or during the manufacture of the body. Experiments carried out have shown already that as low a proportion of organic material as 10–15 percents by weight is sufficient to provide the major amount of heat required.

It is already known per se (British Patent Specification No. 998,132) to remove the organic components present in a contact body built up of asbestos layers for the purpose of preventing fire so that a contact body does not ignite during use e.g. in a moisture exchanger where it is exposed to the relatively hot regeneration gas. However in this known situation it has been a condition that the asbestos fibers must not be heated to the temperature of dehydration at which the water of crystallization is released since the asbestos fibers in the finished body are required to a substantial extent for imparting to the contact body the necessary mechanical strength. The heat treatment in this previous method has been carried out by means of a gas current that has been heated to a moderate temperature, and, furthermore, the combustion has been effected so that no increase of temperature exceeding the dehydration temperature could occur. On the other hand in the heat treatment according to the invention an object is that the water of crystallization shall be released so that the asbestos loses its fibrous character and the fibers are imparted a powder-like state. The necessary mechanical strength is then imparted by the combination of the asbestos together with an inorganic coating added in advance forming a skeleton.

The inorganic coating on the asbestos layers can be brought about during the manufacture of the contact body by causing two substances in aqueous solution to react with one another. Examples of such solutions are solutions of sodium — or potassium — water-glass and a metal salt, such as calcium chloride which react with one another into a scarcely soluble calcium-silicon compound. Alternatively the coating may be formed of silica. Especially when the final product is to consist of sintered layers the inorganic substances may include silicon and aluminium.

Thus according to the present invention a method of manufacturing a contact body which is built up of thin layers of hydrated asbestos fibers shaped between mutually spaced support positions to form channels extending from end to end, the layers having a coating of at least one inorganic substance the method comprising heating the layer body to at least the dehydration temperature of the asbestos at which the water of crystallization is released by passing a current of hot gas through the said channels for a relatively short time to effect the intended action on the body.

The various treatments of a contact body may be of the kind disclosed in the patents applied for simultaneously and reference is directed to those specifications for a more detailed description of the treatments these applications being identified as U.S. patent application Ser. Nos. 564,115 and 564,117, both of which were filed with the present application on Apr. 1, 1976.

As mentioned above, a contact body is composed of layers which form a plurality of fine channels extending from end to end. In a suitable embodiment intended for e.g. heat and/or moisture exchangers for two gas currents or catalysts, the body may be built up of layers alternately corrugated and plane asbestos foils, whereby they form mutually parallel channels extending from end to end. The average spacing between the asbestos foils is preferably less than 1.5 mm which means for this embodiment that the height of the folds of the corrugated layers is the double thereof, e.g. 3 mms at the utmost. The contact body blank may have the shape of a cylinder or rotor. A contact body built up in this way is coated or impregnated with one or more inorganic substances and subjected to the heat treatment according to the invention. In order to effect the treatment in the short time intended with the hot gas current it is important that the layers are very thin. Thus the thickness, including the coating, amounts to only one tenth or some few tenths of one millimeter.

When the contact body is to be used for the interaction between a liquid and a gas, such as water and air in a cooling tower or moistening device, the average spacing between the layers is greater, such as 10–50 mms for the cooling tower and 4–15 mms for moistener devices. All the layers can be corrugated with the corrugations crossing one another in adjacent layers.

The removal of the solvent, primarily the water, with which the inorganic substance or substances are applied to the body built up of asbestos layers, may be effected in one and the same step as the final heat treatment of the body. In the method of the invention it is particularly advantageous to cause the hot gas to pass through the channels of the contact body from below and upwards. In so doing the gas current initially evaporates the water and thereafter increases the temperature of the body over the boiling point of the water and further over the dehydration temperature at which the water of crystallization is released from the asbestos fibers.

Since the contact body is heated from below the zone at which the water is evaporated moves progressively up the body whilst heating to the high final temperature can take place simultaneously in a zone located below. The heat content of the gas current previously heated to the high temperature will during the major part of the treating time be of the order of about 100° C. The entire treatment can be performed in less than 30 min. and even in less than 15 min.

Since the final heating of the contact body above the dehydration temperature or up to the sintering temperature need not require more than a few minutes, the process is so economical with respect to the heat that the treatment gas can be allowed to escape into the atmosphere after it has left the contact body. Thus, the gas current need not be recirculated even though its enthalpy at the outlet obviously can be used for preheating fresh combustion air.

It is easily understood that the heat process need not be effected in a furnace the interior of which is heated to a predetermined final temperature but it is sufficient that a hot gas current pass through and around the contact bodies without these being enclosed inside a furnace shell which greatly simplifies the heat treatment.

What is claimed is:
1. A method of manufacturing a contact body which is built up of thin layers of hydrated asbestos fillers shaped between mutually spaced support positions to form channels extending from end to end, the layers having a coating thereon formed of at least one inorganic substance having the property that it will form a support skeleton for the asbestos layers to which it is applied, after water in the asbestos fibers is removed therefrom, said method comprising the steps of heating the layer body to at least the dehydration temperature of the asbestos fibers to release the water of crystallization therefrom by heating a stream of gas and then passing a current of the heated gas through the channels in the body for a relatively short time of one hour or less to remove water, including the water of crystallization, from the body.

2. A method according to claim 1 wherein the layer body is coated with two inorganic substances and the heating of the layer body effects the sintering together of the substances.

3. A method according to claim 2 wherein a solvent used for applying the inorganic substances onto the asbestos layers is released in the same treating step as the heating with the hot gas current to produce the final product.

4. A method according to claim 3 wherein the solvent is water.

5. A method according to claim 1 wherein the temperature and the velocity of the gas current are adjusted so that the properties of the final product are reached by treatment with the gas current in less than one hour.

6. A method according to claim 5 wherein the treatment is effected within less than half an hour.

7. A method according to claim 1 wherein the asbestos layers contain an organic binding agent keeping the fibers together and the heat treatment causes the binding agent to burn, thus transferring heat to the hot gas current.

8. A method according to claim 7, wherein the organic binding agent is present in sufficient quantity so that a substantial amount of the heat required for the increase of temperature during the heat treatment is provided by the combustion of the organic material.

9. A method of manufacturing a contact body which is formed of a plurality of thin layers of hydrated asbestos fibers shaped between mutually spaced support positions to form channels extending from end to end, the layers having a coating thereon formed of at least one inorganic substance selected from the group consisting of sodium or potassium waterglass with calcium chloride and silica to form a support skeleton for the asbestos layers to which it is applied after water in the asbestos fibers is removed therefrom, said method comprising the steps of heating the layer body to at least the dehydration temperature of the asbestos fibers to release the water of crystallization therefrom by heating a stream of gas to approximately 1000° C and passing a current of the heated gas through the channels in the body for a relatively short time of one hour or less to remove water, including the water of crystallization from the body.

* * * * *